United States Patent [19]
Nalewajek et al.

[11] Patent Number: 4,584,184
[45] Date of Patent: Apr. 22, 1986

[54] SEPARATION AND RECOVERY OF MOLYBDENUM VALUES FROM URANIUM PROCESS WASTE

[75] Inventors: David Nalewajek, West Seneca; Lynn E. McCurry, Hamburg; David J. Friedland, Snyder; Richard E. Eibeck, Orchard Park, all of N.Y.

[73] Assignee: Allied Corporation, Morris Township, Morris County, N.J.

[21] Appl. No.: 612,282

[22] Filed: May 21, 1984

[51] Int. Cl.⁴ .................. C01G 43/01; C01G 39/02
[52] U.S. Cl. ........................ 423/15; 423/17; 423/55; 423/260; 423/606
[58] Field of Search .............. 423/15, 19, 260, 55, 423/606, 17

[56] References Cited

U.S. PATENT DOCUMENTS

| | | | |
|---|---|---|---|
| 3,288,570 | 11/1966 | Henrickson | 23/328 |
| 3,366,714 | 1/1968 | Popoff | 260/933 |
| 3,790,658 | 2/1974 | Fox et al. | 423/15 |
| 3,806,579 | 4/1974 | Carles et al. | 423/19 |
| 3,842,155 | 10/1974 | Muller et al. | 423/19 |
| 4,011,296 | 3/1977 | Ruiz et al. | 423/4 |
| 4,092,399 | 5/1978 | Narayan et al. | 423/7 |
| 4,199,551 | 4/1980 | Laferty et al. | 423/55 |
| 4,234,550 | 11/1980 | De Hollander | 423/15 |
| 4,292,279 | 9/1981 | Reusser | 423/15 |
| 4,304,757 | 12/1981 | Kuehl et al. | 423/15 |
| 4,393,028 | 7/1983 | Crossley | 423/15 |
| 4,407,781 | 10/1983 | Crossley et al. | 423/15 |
| 4,451,439 | 5/1984 | Maurel et al. | 423/55 |

Primary Examiner—Edward A. Miller
Attorney, Agent, or Firm—Arthur J. Plantamura; Jay P. Friedenson; Richard C. Stewart, II

[57] ABSTRACT

A method for treating process waste consisting of uranium hexafluoride, $UF_6$, molybdenum hexafluoride, $MoF_6$ and molybdenum oxytetrafluoride, $MoOF_4$ is provided wherein the foregoing mixture is hydrolyzed in an aqueous solution of ammonium carbonate and ammonium hydroxide. The resulting mother liquor is digested at 60°–80° C. to drive off carbon dioxide and convert the ammonium uranyl carbonate, $(NH_4)_4UO_2(CO_3)_3$ to ammonium diuranate, $(NH_4)_2U_2O_7$. The pH is maintained above 9 to prevent premature precipitation of the molybdenum values as molybdic acid or uranyl molybdate.

The ammonium diuranate which forms as a yellow solid is filtered, slurried in aqueous ammonium hydroxide, filtered and dried. The yield is quantitative. Pyrolysis results in conversion of the diuranate salt to uranium oxide, $U_3O_8$, of suitable purity to be recycled in the uranium hexafluoride production process. The combined filtrates which contain the molybdenum values and ammonium fluoride by-product are diluted, and stirred, with 95% ethanol to precipitate white, crystalline, ammonium molybdate, $(NH_4)_2MoO_4$. The ammonium fluoride remains soluble. The ammonium molybdate is filtered, dried and calcined at 600° C. for 2 hours to yield molybdenum trioxide, $MoO_3$ in >90% yield and essentially free of uranium contamination. Fluoride contamination in either of the reprocessed materials is minimal.

3 Claims, 1 Drawing Figure

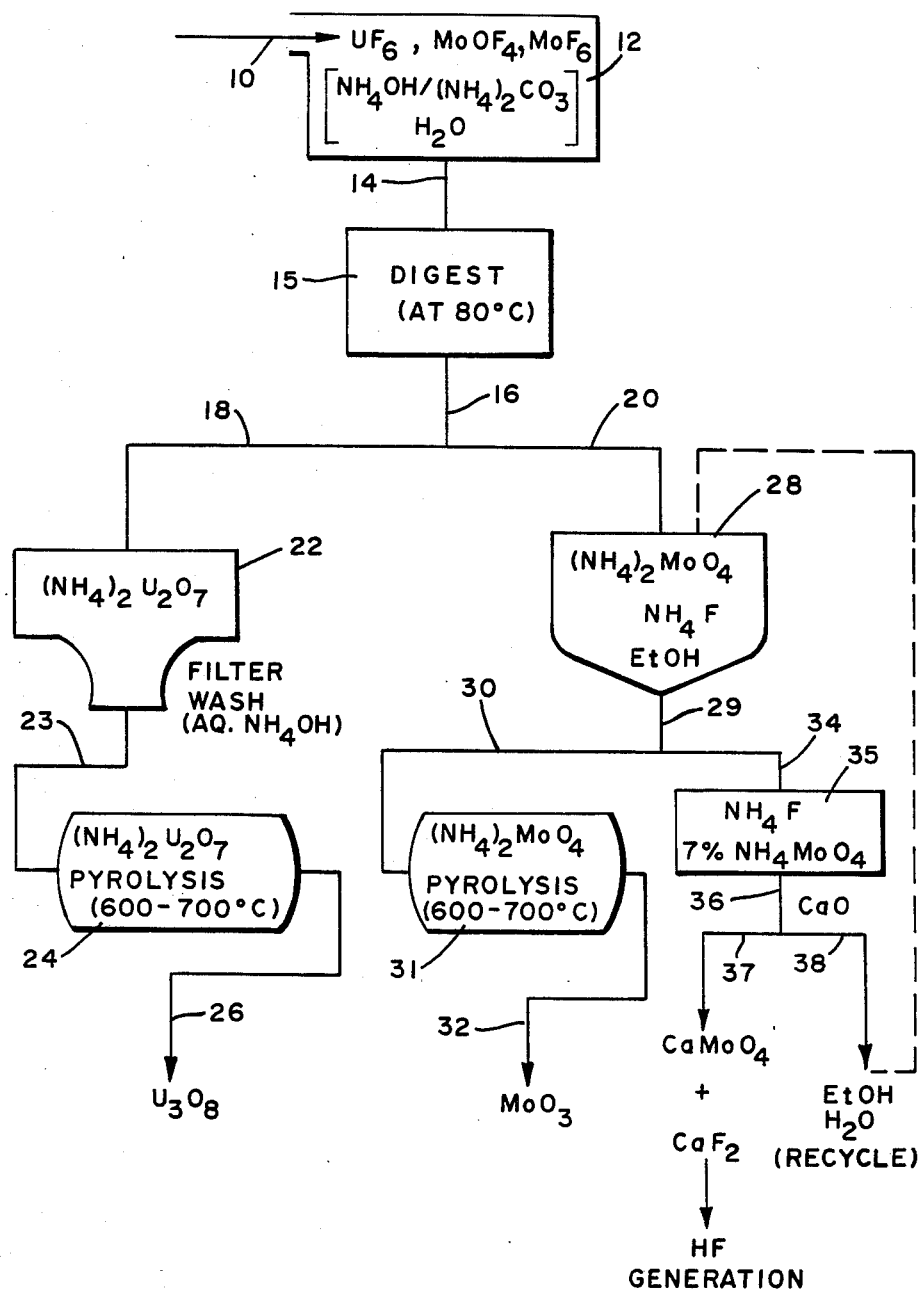

SEPARATION AND RECOVERY OF MOLYBDENUM VALUES FROM URANIUM PROCESS WASTE

DESCRIPTION

This invention relates to a method for recovering the molybdenum and uranium values from process waste generated during production of nuclear grade uranium hexafluoride. More particularly the invention deals with a method for converting the molybdenum and uranium values from such process into compounds, which can be conveniently separated from each other and from fluoride impurities, in sufficient purity to be recycled in the process or sold.

BACKGROUND OF THE ART

In the production of nuclear grade uranium hexafluoride, crude $UF_6$ containing small amounts of vanadium, titanium and to a greater extent molybdenum are vaporized and fed into a boiler still for processing. While the low boiling impurities (i.e., HF, $VOF_3$) are easily removed before the distillation of $UF_6$ commences, the molybdenum contamination remains. Continuous batch-to-batch refinement of crude uranium hexafluoride results in the accumulation of molybdenum impurities in the high boiler still bottom until co-distillation of the molybdenum impurities with the $UF_6$ takes place. The uranium hexafluoride product made when co-distillation occurs fails to meet regulatory specifications and therefore must be stored as process waste or disposed of in a low level radioactive waste burial site. The elimination of these two alternatives via recycling would enhance the economics of production.

Conventional separation methods for recovering uranium values from acid leach liquors are known. Generally, these processes utilize either ion exchange or solvent extraction technology. Problems are encountered in regard to product purity particularly in the presence of high molybdenum and fluoride ion concentrations which are present in a process-by-product stream and therefore these methods are incompatible in such processes.

The prior art has recognized a need for removing molybdenum from uranium. However, prior art methods have not addressed the problem of molybdenum recovery. Such methods include the ion-exchange work of Fox et al. in U.S. Pat. No. 3,790,658; Ruiz et al. U.S. Pat. No. 4,092,399 or Kuehl et al. in U.S. Pat. No. 4,304,757. The limitations of these methods for reclamation of metal values in a different process waste are pronounced. For example, it is well known that molybdenum will react similarly to uranium in forming anionic complexes which will be adsorbed on resins. As the molybdenum values continue to increase on the resin, a decrease in the total uranium capacity results. In practice efforts are made to control the molybdenum concentration by blending ore leachates to keep the levels of molybdenum in the range of 0.01 to 0.02 grams per liter. In dealing with process waste of a different system, concentrations of up to 50% by weight of molybdenum is present. Clearly, dilution to achieve separation by these methods is not economical. Of much greater concern is the high fluoride ion concentration produced during hydrolysis of the process waste. It has been bound that premature breakthrough of uranium and molybdenum occurs when high concentrations of fluoride ion ($>=1000$ ppm) is present. This inevitably results in an unacceptably high cross contamination factor for the reprocessed metals as well as a final product which contains fluoride ion exceeding the tolerance limits. An alternative process must obviously be designed.

Attempts to use conventional solvent extraction technology such as that described in U.S. Pat. No. 4,011,296 results in limited practicality. High concentrations of molybdenum in the process waste build up in the amine extractant and act as a "poison" in a manner similar to that observed with the ion exchange resins. This usually occurs when the concentration of molybdenum exceeds 0.03 g per liter of organic phase. Eventually, a maximum tolerance level is reached after which point precipitation of complex amine heteropolymolybdates occurs. The precipitate forms at the organic-aqueous interface as a gummy mass which seriously interferes with the operation. Compounding the problem is the high fluoride ion concentration present in our waste. The formation of uranyl fluorides is possible thus causing these complexes to be retained in the organic phase during stripping. The result is an unacceptable cross-contamination level in the recovered metals. The high fluoride ion concentration also augments the problem by interfering with a rapid phase separation.

An attempt to use the precipitation technique disclosed by Crossley in U.S. Pat. No. 4,393,028 was found to be incompatible for use with a different process waste. Undesirable cations deleterious to the recycling of the uranium values are introduced, the conversion of molybdenum values molybdenum trioxide are not possible, and all products become cross contaminated with fluoride containing compounds to an extent which prevents recycling or resale of the product.

It is therefore apparent, that a means to recover the molybdenum and uranium values from process hydrolysate containing high molybdenum and fluoride ion concentrations would be most desirable. Accordingly, it is an object of this invention to provide a process for the separation of the metal values from the high boiler still bottom residue insufficient purity to allow the uranium values to be recycled in the $UF_6$ process and the molybdenum values to be reclaimed as molybdenum oxide for subsequent sale to the metals trade (i.e., manufacture of stainless steel, etc.).

SUMMARY OF THE INVENTION

The present invention provides a method of separating and recovering molybdenum and uranium values from process waste generated during processing of nuclear grade uranium hexafluoride. Important aspects of the invention reside in the fact that both the molybdenum and uranium values can be recovered in sufficient purity to be recycled or sold. The expense of storage or disposal in a low level nuclear waste burial site are eliminated. In the method of the invention, process waste consisting of uranium hexafluoride, $UF_6$, molybdenum hexafluoride, $MoF_6$ and molybdenum oxytetrafluoride, $MoOf_4$ is hydrolyzed in an aqueous solution of ammonium carbonate and ammonium hydroxide. The resulting mother liquor is digested at 60°–80° C. to drive off carbon dioxide and convert the ammonium uranyl carbonate, $(NH_4)_4 UO_2(CO_3)_3$ to ammonium diuranate, $(NH_4)_2U_2O_7$. Periodic pH checks are performed to ensure that the pH value remains above 9 to prevent premature precipitation of the molybdenum values as molybdic acid or uranyl molybdate.

The solid ammonium diuranate which forms is filtered slurried in aqueous ammonium hydroxide, filtered and dried. Upon pyrolysis the diuranate salt thus recovered is converted to the uranium oxide, $U_3O_8$, having sufficient purity for recycling in a uranium hexafluoride production process. The combined filtrates containing molybdenum and ammonium fluoride by-product are diluted with ethanol and stirred until crystalline ammonium molybdate precipitates and is isolated from the ammonium fluoride which remains soluble.

BRIEF DESCRIPTION OF THE DRAWING

The single FIGURE of the drawing illustrates the process of the invention, the details of which are elaborated upon more fully hereinafter.

DETAILED DESCRIPTION OF THE INVENTION

In accordance with the present invention, process waste consisting of uranium hexafluoride, $UF_6$, molybdenum hexafluoride, $MoF_6$ and molybdenum oxytetrafluoride, $MoOf_4$ is hydrolyzed in an aqueous solution of ammonium carbonate and ammonium hydroxide. The resulting mother liquor is digested at 60°–80° C. to drive off carbon dioxide and convert the ammonium uranyl carbonate, $(NH_4)_4 UO_2(CO_3)_3$ to ammonium diuranate, $(NH_4)_2U_2O_7$. Periodic pH checks are performed to ensure that the pH value remains above 9. In so doing, premature precipitation of the molybdenum values as molybdic acid or uranyl molybdate is prevented.

In monitoring the digestion, ammonium hydroxide is added if the pH value falls below 9. The ammonium diuranate which forms as a yellow solid is filtered, slurried in hot aqueous ammonium hydroxide for 2 hours, filtered and dried. The yield is quantitative. In practicing the present process it is not necessary to use the autoclave digestion technique to remove the molybdenum contaminant as described by Kuehl in U.S. Pat. No. 4,304,757. Pyrolysis results in conversion of the diuranate salt to uranium oxide, $U_3O_8$, of suitable purity to be recycled in the uranium hexafluoride production process. The combined filtrates which now contain the molybdenum values and ammonium fluoride byproduct are diluted two fold with 95% ethanol and stirred for 2 hours. White, crystalline, ammonium molybdate, $(NH_4)_2MoO_4$, begins to precipitate after 0.25 hours. The ammonium fluoride remains soluble. The ammonium molybdate is filtered, dried and calcined at 600° C. for 2 hours to yield molybdenum trioxide, $MoO_3$ in >90% yield and essentially free of uranium contamination. Fluoride contamination in either of the processed materials is <2 ppm.

The invention will be further illustrated by the following example. It will be understood, however, that although the example may describe in detail certain preferred operation conditions of the invention, the example is provided primarily for purposes of illustration and the invention in its broad aspects is not limited thereto.

EXAMPLE 1

A 1 L stainless steel flask equipped with a dropping funnel and mechanical stirrer was attached to a vacuum line, evacuated, and cooled to −78° C. 40 grams of mixed fluorides of uranium and molybdenum were vacuum transferred. The flask was pressurized with nitrogen and the dropping funnel charged with 0.5 L of an aqueous ammonium carbonate/ammonium hydroxide solution (150 g $(NH_4)_2CO_3$/L. Sufficient ammonium hydroxide was added to bring the pH value to $\leq 10$. The batch temperature was raised to 0° C. to −20° C. and with constant stirring, the carbonate solution added at a rate of 4 mL/min. (For large scale production, the bath temperature as well as the addition rate can be increased provided an efficient internal heat transfer unit is installed). After 2 hours, the addition was complete and the flask warmed to room temperature (0.5 hours). The contents of the flask were digested at 80° C. for 4–6 hours in order to precipitate ammonium diuranate. Constant monitoring of the pH value was performed to ensure that the pH did not decrease below 9. The ammonium diuranate was filtered, transferred to a flask containing 250 mL of ammonium hydroxide, and vigorously stirred. After digesting at 60°–80° C. for 2 hours, to remove any coprecipitated $UO_2MoO_4$, the ammonium diuranate was filtered, dried and roasted for 2 hours at 600°–700° C. A yield of 18 g $U_3O_8$ was obtained. Trace metal analysis revealed only 220 ppm of molybdenum. A second digestion of the ammonium diuranate (above) before roasting yielded $U_3O_8$ that contained 10 ppm molybdenum. The filtrate from the above procedure was diluted with 1.2 L of 95% ethanol and vigorously stirred. After 0.25 hours, the white precipitate of $(NH_4)_2MoO_4$ began to form. Stirring was continued for 2 hours followed by filtration and roasting at 600°–700° C. for 2 hours. The molybdenum recovered as $MoO_3$ (12.4 g, 93% yield) had the following analysis: U(ppm)=not detected; $F^-$ = <2 ppm.

The implementation of the process of the invention to a larger scale operation is described by reference to the flow diagram of the drawing.

As shown in the flow diagram of the drawing, the uranium hexafluoride process by-product is introduced at 10 into the vessel 12 where the by-product is suitably hydrolyzed such as by bubbling it into aqueous carbonate/ammonium hydroxide solution. The hydrolyzed product withdrawn at 14 is then digested at 15 to decompose the soluble ammonium uranyl carbonate into an insoluble ammonium diurananate product.

The solid ammonium diuranate is then fed at 18 to a washing operation utilizing a suitable aqueous base e.g. ammonium hydroxide. The washed solid at 23 is then pyrolyzed at 24 to yield the uranium oxide, $U_3O_8$ product.

The soluble matter liquor removed at 16 from the hydrolysis and digestion of the waste by product is withdrawn at 20 and is treated with ethanol at 28 to effect a precipitation of the ammonium molybdate. The reaction product is then withdrawn at 29 and the solid precipitate is separated from the ammonium fluoride which remains in solution and is removed at 34. The ammonium molybdate is then pyrolyzed at 31 to yield the molybdenum oxide, $MoO_3$ (which is a commercial product) at 32. $MoO_3$ may be used, for example, in the metal processing industry.

The ammonium fluoride solution 35 is treated at 36 with calcium oxide to precipitate any molybdenum salt, $CaMoO_4$, not previously removed, and any fluoride present as calcium fluoride. The calcium fluoride, $CaF_2$ is employed in the production of hydrogen fluoride. The filtrate at 38 is distilled to separate the azeotropic ethanol/water mixture which is recycled to the precipitating operation at 28.

It will be understood that variations may be made in the several conditions and ranges disclosed and that these limitations, provided in order to more particularly describe the invention, should not be regarded as limitations except as set forth in the claims.

What is claimed is:

1. A method of recovering molybdenum and uranium values from a process waste generated from the production of nuclear grade uranium hexafluoride comprising the steps of
   (a) hydrolysing the process waste which contains $UF_6$, $MoF_6$ and $MoOF_4$ in an aqueous solution containing ammonium carbonate and ammonium hydroxide thereby forming ammonium uranyl carbonate;
   (b) digesting while maintaining a pH above 9, the resulting mother liquor at a temperature of about 60°–80° C. to evolve $CO_2$ and convert the ammonium uranyl carbonate to solid ammonium diuranate;
   (c) filtering, washing and drying the solid ammonium diuranate.

2. The method of claim 1 wherein the diuranate of step (c) is pyrolyzed to $U_3O_8$ product.

3. The method of claim 1 wherein the combined filtrates containing molybdenum values and ammonium fluoride by-product are diluted with ethanol and precipitating therefrom ammonium molybdate, filtering and pyrolyzing the ammonium molybdate at a temperature of about 600° C. to yield $MoO_3$ product substantially free of uranium and fluoride contamination.

* * * * *

UNITED STATES PATENT AND TRADEMARK OFFICE
CERTIFICATE OF CORRECTION

PATENT NO. : 4,584,184
DATED : April 22, 1986
INVENTOR(S) : D. Nalewajek et al.

It is certified that error appears in the above-identified patent and that said Letters Patent are hereby corrected as shown below:

Column 1, line 66: "bound" should be -- found --.

Column 2, line 42: "insufficient" should be -- in sufficient --.

line 60: "MoOf$_4$" should be -- MoOF$_4$ --.

Column 3, line 22: "MoOf$_4$" should be -- MoOF$_4$ --.

Column 4, line 41: "diuranante" should be -- diuranate --.

Column 5, line 9: "MoOf$_4$" should be -- MoOF$_4$ --.

Signed and Sealed this

Seventeenth Day of February, 1987

Attest:

DONALD J. QUIGG

Attesting Officer

Commissioner of Patents and Trademarks